Figure 6:
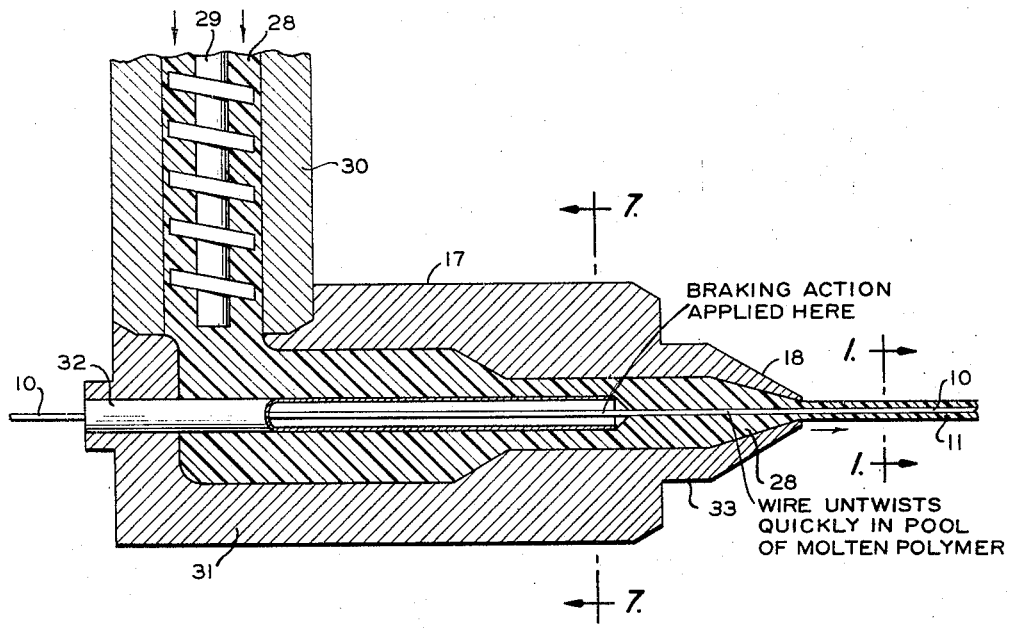

Sept. 22, 1959  J. V. SMITH  2,904,846
METHOD FOR COATING FILAMENTOUS ARTICLES
Filed Dec. 31, 1956  2 Sheets-Sheet 1
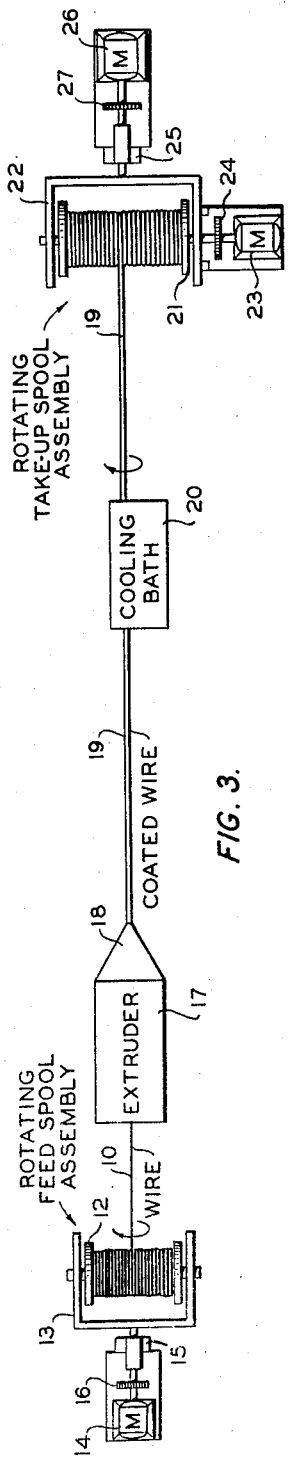
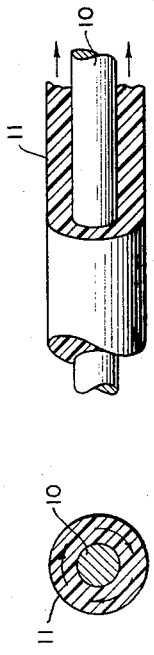
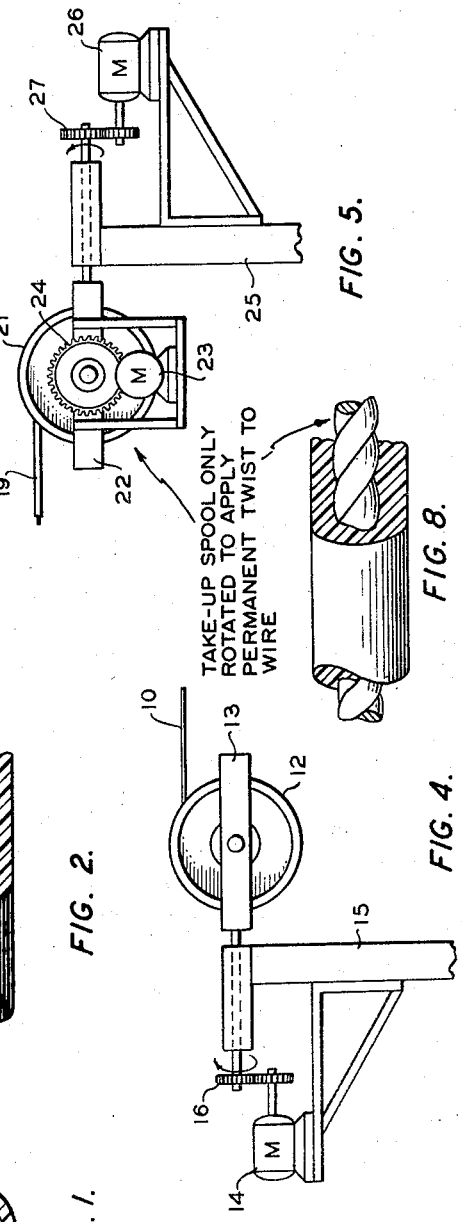
INVENTOR.
J. V. SMITH
BY Hudson & Young
ATTORNEYS Sept. 22, 1959          J. V. SMITH          2,904,846
METHOD FOR COATING FILAMENTOUS ARTICLES
Filed Dec. 31, 1956          2 Sheets-Sheet 2

INVENTOR.
J. V. SMITH
BY
ATTORNEYS 2,904,846

METHOD FOR COATING FILAMENTOUS ARTICLES

James V. Smith, Bartlesville, Okla., assignor to Phillips Petroleum Company, a corporation of Delaware Application December 31, 1956, Serial No. 631,570

2 Claims. (Cl. 18—59)

This invention relates to a method of coating filamentous articles such as wire, cable, and the like, with polymeric coatings. In other aspect this invention relates to a method of improving the resistance of such polymeric coatings to stress-cracking. In still another aspect, this invention relates to a method of applying thermoplastic coatings to wires, cables, or the like in such a manner as to produce either transverse or biaxial molecular orientation in said coatings.

Thermoplastic polymeric coatings such as polyethylene, are quite useful for insulating wires and cables for electrical applications. Polyethylene coatings have been found especially valuable in high frequency uses; however these high molecular weight polymers, which have the advantages of high tensile strength and good abrasion resistance, tend to exhibit, in varying degrees, susceptibility to cracking or rupturing when placed under stress and exposed to various conditions such as the action of moisture, solvents, acids and the like. Considerable effort has been expended in attempts to improve the resistance of these materials to stress-cracking caused by the environment to which the coating is exposed in normal usage or by conditions of elevated temperature coupled with stress applied to the coating such as by twisting or winding. Improvements in tensile strength of polymeric coatings of this type can be effected by stretching the polymer as it is applied by extruding the polymeric material at one velocity and drawing the wire through the coating head of the extrusion apparatus at a higher velocity. Such a treatment tends to improve the tensile strength of the coating by molecular orientation of the polymer along its longitudinal axis; however, it is not evident that this coating method produces improvement in stress-cracking resistance. Stress-cracking tends to occur along lines parallel to the longitudinal axis of the coating, and molecular orientation in this direction does not produce sufficient strength in the transverse direction to supply the needed resistance to stress-cracking.

According to my invention, polymeric coatings of the type described are improved in resistance to stress-cracking, both environmental stress-cracking and heat stress-cracking, by producing molecular orientation within the coating in the transverse direction. Molecular orientation thus produced cuts across lines of normal stress-cracking and strengthens the polymeric coating against failure of this kind. Molecular orientation of this type is produced according to the method of my invention by rotating the wire as it passes through a pool of softened polymer in the extrusion apparatus so that the polymer is applied to the wire circumferentially. As the polymer is applied, it adheres to the wire and is stretched in a direction which is transverse to the longitudinal axis of the wire and thus a molecular orientation of varying degree can be produced in this direction within the coating. Basically, to produce this stretching and thus the orientation, it is important that the polymer be applied to the wire and stretched in the circumferential direction of the wire. This is accomplished by rotating a wire through a stationary pool of softened polymer or by rotating the molten polymer about a stationary wire or by rotating the two at different speeds or in opposite directions. By "stationary" I mean not rotating, for as long as a relative rotary movement is maintained between the pool of polymer and the wire, the result of my invention is accomplished. It is further possible to combine longitudinal orientation with the transverse orientation and thereby obtain advantages in improved tensile strength plus resistance to stress cracking. This is done by rotating the wire while drawing it through the coating apparatus at a higher velocity than that at which the polymer is extruded. The nature of the molecular orientation depends to some extent upon the relative rates of rotation and linear velocity differential between the wire and the polymer as the wire passes through the coating apparatus. For high rates of rotation with low linear velocity differentials, orientation is predominately transverse. As the linear velocity differential increases, orientation of molecules assumes a helical pattern, however, since the direction of orientation still cuts across the lines of stress-cracking, improvement in resistance to this type of failure is realized.

Figure 7:
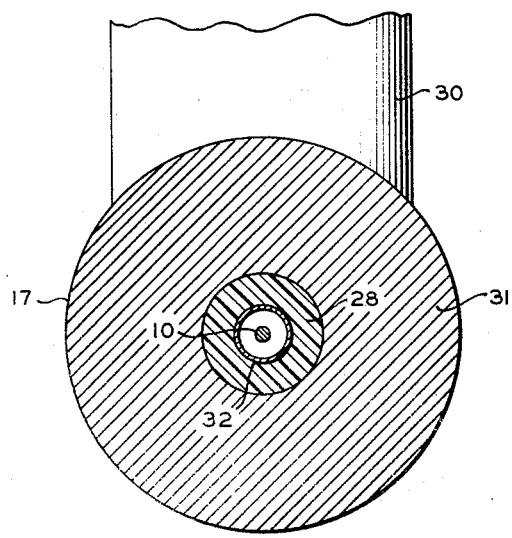

It is an object of this invention to provide a method for coating filamentous articles with coverings of thermoplastic polymer in such a manner as to improve the resistance of these coverings to stress-cracking. It is another object of this invention to provide a method of producing transverse molecular orientation in polymeric wire and cable coverings. It is still another object of my invention to provide a method of coating wire with an ethylene polymer in such a manner that biaxial molecular orientation is produced in said coating. Other objects, advantages and features of my invention will be apparent to those skilled in the art from the following discussion, claims and drawings, in which Figures 1 and 2 are cross-sections of the polymeric coating, Figure 3 is a schematic diagram of a coating operation, Figures 4 and 5 are details of the wire rotating mechanism, Figure 6 is a cut-away of an extrusion coating apparatus, Figure 7 is a cross section of Figure 6 as indicated, and Figure 8 is a sectional view of a coated wire having a permanent twist.

Many types of filamentous articles can be coated with thermoplastic coverings according to the method of my invention. While particularly useful for coating wires and small cables, the invention can also be applied in the coating of various strands and fibers, such as rope, thread, tubes, braided filaments or even other polymeric strands of material similar or identical to the coating material, thus producing a solid strand of polymer having a molecularly orientated surface. I prefer to use my invention, however, for the coating of wires such as are used in electrical applications.

Broadly, any thermoplastic polymer which is capable of molecular orientation by stretching the softened polymer can be satisfactorily employed in the practice of my invention. My invention has particular utility, however, and is thus preferably applied to processing polymers which have a degree of crystallinity as determined by nuclear magnetic resonance, by X-ray or by infrared methods. Preferred among these are the ethylene polymers and especially those ethylene polymers having a degree of crystallinity above about 75, preferably above 80 percent at 25° C. as determined by nuclear magnetic resonance. This method of determining polymeric crystallinity is discussed and described by Wilson and Pake in The Journal of Polymer Science, 10, 503 (1953).

A preferred method of preparing polymers of this type is by polymerizing ethylene with or without copolymerizable monomers selected from mono-olefins having from 3 to 8 carbon atoms per molecule and preferably not over 4 carbon atoms per molecule, such as propylene, 1-butene and 2-butene, in the presence of a catalyst comprising chromium, a portion of which is hexavalent (preferably at least 0.1 percent by weight of the total catalyst) as chromium oxide associated with at least one oxide from the group consisting of silica, alumina, zirconia and thoria. The total chromium content of the catalyst is preferably between 0.1 and 10 weight percent. Polymerization is ordinarily carried out at temperatures between 150 and 450° F., and the pressure of the reaction can vary over a wide range, for example, from atmospheric pressure to 1000 pounds per square inch or higher. Generally, however, this reaction is known as a low pressure polymerization. The reaction can be carried out in the gaseous phase; but when a diluent is used, the minimum pressure is that necessary to maintain the diluent in a liquid phase. Preferably, a solvent is used which is liquid, nondeleterious and inert under contacting conditions, such as hydrocarbon solvents, especially naphthenic hydrocarbons and paraffinic hydrocarbons of from 3 to 12 carbon atoms, for example, propane, normal pentene, isopentane, isooctane, cyclohexane and methylcyclohexane. For commercial applications, reaction pressure in the range of about 100 to 700 pounds per square inch absolute is ordinarily preferred.

The effluent withdrawn from the reactor comprises a solution of polymer in solvent and when slurry or suspended catalyst is used, the effluent also contains catalyst. Unreacted monomers are removed by flashing and the solution with or without the addition of more solvent is filtered, centrifuged or the like to remove the catalyst. The catalyst-free solution is then passed to suitable recovery steps for removal of the solvent, such as by evaporation or flashing, and solid polymer is recovered in these steps or by precipitation. The catalyst removal step is optional and for some applications the catalyst can be allowed to remain in the finished polymer. The solid polymer is ordinarily processed further in order to be placed in condition for storage. A suitable form is pellets or granules which can be prepared by extrusion of the polymer into strands which are then cut or chopped in a pelletizer. Polymer thus formed can be readily remelted for fabrication by molding or extrusion such as by the wire coating methods of this invention.

The preparation of such olefin polymers is more fully described in copending application of Hogan and Banks, Serial No. 573,877, filed March 26, 1956, now U.S. Patent 2,827,721.

Although the ethylene homopolymer is preferred for many applications because of its superior tensile strength of about 4400 pounds per square inch, high density of at least 0.955, and high crystallinity of at least 90 percent at 25° C., copolymers of ethylene with up to 30 weight percent of the total monomer system as monoolefin having from 3 to 8 carbon atoms can also be employed advantageously. The degree of crystallinity of the copolymer tends to be reduced as the amount of ethylene in the monomer system is decreased and preferably therefore, the amount of the higher molecular weight comonomer is limited to about 15 weight percent of the total monomer system.

While the above described method is preferred for the manufacture of the ethylene polymer to be used in my invention, any process which will yield a product having the desired physical characteristics, that is, a relatively high crystallinity, is satisfactory. For example, ethylene can be polymerized with or without comonomers of acyclic olefins in the presence of a number of catalyst systems, preferably comprising an organometal derivative as one component. Such catalyst compositions can have two or more components, one component being an organometal compound, a metal hydride, or a group I, II or III metal, and the other component being a compound of a group IV to VI metal. With certain of the above two component systems, an organic halide having 30 or less carbon atoms per molecule or a metal halide can be used advantageously as a third catalyst component. Specific examples of suitable catalyst systems are triethylaluminum and titanium tetrachloride, mixtures of ethyl aluminum halides and titanium tetrachloride, titanium tetrachloride and sodium or magnesium, and titanium tetrachloride with lithium aluminum hydride and ethyl bromide.

Referring now to the drawings to further describe my invention, Figures 1 and 2 show the direction of molecular orientation which can be effected in the polymeric coating by the embodiments of my invention. In Figure 1, a cross section is shown of wire 10 and coating 11. The arrows in coating 11 show the direction of molecular orientation imparted by applying the coating to the wire while rotating the wire about its longitudinal axis, or by rotating the pool of polymer about the wire. This direction of orientation is perpendicular to the orientation shown by Figure 2. The arrows of Figure 2 show the longitudinal orientation which is produced by drawing the wire through the extrusion apparatus at a higher velocity than the rate at which the polymer is extruded. Naturally, all the molecules in the polymer do not become oriented, but orientation of any degree in contrast to complete random molecular arrangement improves the strength of the polymer in the direction of orientation.

Referring now to Figure 3, a specific embodiment in the process of my invention is described by way of further clarification thereof. In Figure 3 wire 10 is supplied from spool 12 which is held by yoke 13 upon stand 15. Motor 14, through gear mechanism 16 rotates the yoke and spool and hence the wire, as it unreels from spool 12. Wire 10 then passes through extruder 17 where it is coated with a covering of polymer extruded through nozzle or die 18. Coated wire 19 then passes through cooling bath 20 where a slow uniform cooling is effected. Uniform cooling is necessary to assure that no voids are formed between the polymer and the wire, since such voids become points of ionization causing breakdown in dielectric strength of the polymer. Coated wire 19 thus cooled, is then drawn to take up spool 21 on which it is wound for storage or transportation. Take up spool 21 is carried by yoke 22 and is driven by motor 23 through gear mechanism 24. Motor 23 provides the power which pulls the wire from feed spool 12 and through extruder 17. Gear mechanism 24 controls the linear speed at which wire is passed through extruder 17. Yoke 22 is supported by stand 25 and is rotated by motor 26 through gear mechanism 27. The direction of rotation and the speed of rotation of yoke 22 is the same as that of yoke 13. Thus, the wire is rotated smoothly and evenly as it passes through extruder 17.

An alternate method is to rotate extruder 17 rather than wire 10. This, of course, would still effect relative rotary movement between the wire and the polymer. It is preferred to rotate the wire however, to eliminate difficulties in feeding polymer to a rotating extruder.

Figures 4 and 5 are side views of the feed and take-up spool assemblies, respectively, shown in Figure 3.

Figures 6 and 7 show in greater detail the extrusion apparatus and the wire as it is passed therethrough. Referring to Figure 6, polymer 28 in a molten condition is forced into extruder 17 through conduit 30 by screw 29. Extruder 17 comprises an extrusion barrel 31 having an open wire-feeding core 32, a wire coating head 33 and an extrusion die which is a nozzle or tapered orifice 18. Wire 10 passes through core 32 into coating head 33 and there it picks up a polymeric coating from the polymer pool 28. Since the wire is rotating, the polymer is applied thereto circumferentially and a stretching action is imparted to the softened polymer.

Because of the action of screw 29, polymer 28 is moving in the longitudinal direction of the wire as indicated by the arrow but it is not moving in the direction of the rotation of the wire. In this instance stretching occurs mainly in a transverse or circumferential direction and molecular orientation is predominately in the cross-section as shown in Figure 1. When the wire is drawn through the coating head at a velocity which is greater than the rate at which the polymer is extruded, there tends to be a stretching action in the longitudinal direction which produces molecular orientation in this direction as well as in the transverse as explained previously. Depending on the relative wire speeds of rotation and linear travel, orientation can be produced in a helical direction within the polymeric coating. Thus, wire 10 with coating 11 leaves extrusion apparatus with any desired degree of longitudinal and transverse orientation depending upon the specific application and the requirements thereof for which the coated wire is intended.

Various modifications of the above described embodiments are possible. For example, as shown in Figure 8 the wire can be twisted during the coating operation by rotating spools 12 and 21 at different speeds or in opposite directions. By employing a braking mechanism on the wire immediately prior to its entry into the extrusion apparatus the wire can be caused to twist prior to coating and untwist during and after the coating is applied. This feature is shown in Figure 6. Other modifications will be apparent to those skilled in the art from the foregoing description.

To further describe my invention, a specific embodiment is discussed in connection therewith. A number 10 gauge wire (0.102 inch in diameter) is coated according to the practice of my invention, employing a standard plastics extruder equipped with a wire coating cross-head. The coating material is a highly crystalline polyethylene prepared by the method previously described in the presence of a chromium oxide-silica-alumina catalyst. Extrusion temperature is 450° F. (Ordinarily a proper extrusion temperature for this type of polymer is in the range of about 400 to 550° F.) The wire is preheated prior to entry into the extrusion head to about the temperature of the molten polymer in order to prevent shock cooling of the polymer as it adheres to the surface of the wire. The wire is drawn through the coating head at a linear speed of about 500 feet per minute while being rotated by rotating the synchronized feed and take-up spools at about 100 revolutions per minute. In other embodiments for wire of similar size the speeds of linear travel and rotation can vary widely, for example, from about 50 or 100 to 1000 or more feet per minute of linear travel and about 30 to 150 revolutions per minute. The speed of rotation, as a practical matter, will be limited by the size of the take-up and feed spools employed in the operation.

Polymer is extruded as a continuous coating upon the wire at a speed approximating that of the linear speed of the wire, thereby applying a coating of about 20 mils thick on the surface of the wire in such a manner that a minimum of stretching occurs in the polymer coating in the longitudinal direction. The exit temperature of the wire and polymer from the extruder is about 425° F. The wire passes through about 2-3 feet of air space and into a cooling bath of water flowing countercurrently to the direction of the wire. The exit temperature of the water at the point of the wire entry is about 175° F. and the inlet temperature of the water at the point of wire exit is about 100° F. The length of the cooling bath is 15 feet. Proper cooling methods of polymer coatings are well-known and can be varied considerably from this specific embodiment. Upon leaving the cooling bath the wire continues to cool to ambient temperature and is wound upon the take-up spool.

Heavy cables can likewise be coated readily by this method but the speed of coating or the linear travel of the cable is generally less than that used for wire, about 25 to 50 feet per minute being satisfactory.

The wire thus coated has a tough protective insulating covering which has a high softening temperature of about 260° F. with good abrasion resistance. In addition the wire has increased strength in its circumferential direction due to molecular orientation and exhibits improved resistance to both environmental and heat stress-cracking.

I claim:

1. A method of applying an ethylene polymer having a crystallinity at 25° C. above 80 percent in a protective coating on a wire so that the coating has improved resistance to environmental stress cracking which comprises supplying a pool of molten ethylene polymer which is a polymerizate of a monomer system comprising from 85 to 100 parts by weight ethylene and from 0 to 15 parts by weight monoolefin having from 3 to 8 carbon atoms per molecule, drawing a wire through said pool so that said polymer adheres to said wire, rotating one end of said wire about its longitudinal axis while said wire is being drawn through said pool thereby imparting a permanent twist to said wire and causing said polymer to be applied to said wire circumferentially, and cooling the polymer coating on said wire uniformly, said coating having transverse molecular orientation.

2. A method of applying a polymer having a crystallinity at 25° C. of at least 80 percent in a protective coating on a wire so that said coating has improved resistance to environmental stress cracking which comprises supplying a pool of molten ethylene polymer which is a polymerizate of a monomer system comprising from 85 to 100 parts by weight ethylene and from 0 to 15 parts by weight monoolefin having from 3 to 8 carbon atoms per molecule, drawing a wire through said pool so that said polymer adheres to said wire, twisting said wire prior to its entry into said pool of polymer, releasing said wire allowing it to untwist as it passes through said pool of polymer thereby causing said polymer to be applied circumferentially in a coating on said wire, and cooling the coating thus formed on said wire uniformly, said coating having transverse molecular orientation.

References Cited in the file of this patent

UNITED STATES PATENTS

| 2,750,626 | Henning | June 19, 1956 |
| 2,765,441 | Gambrill | Oct. 2, 1956 |

FOREIGN PATENTS

| 910,430 | Germany | May 3, 1954 |